US 6,667,793 B2

(12) United States Patent
Goulding et al.

(10) Patent No.: US 6,667,793 B2
(45) Date of Patent: Dec. 23, 2003

(54) BROADBAND LIQUID CRYSTAL PIGMENTS

(75) Inventors: Mark Goulding, Ringwood (GB); Matthias Kuntz, Seeheim (DE); Mark Verrall, Blandford Forum (GB); David Coates, Wimborne (GB)

(73) Assignee: Merck Patent Gesellschaft, Darmstadt (DE)

(*) Notice: Subject to any disclaimer, the term of this patent is extended or adjusted under 35 U.S.C. 154(b) by 320 days.

(21) Appl. No.: 09/809,420

(22) Filed: Mar. 16, 2001

(65) Prior Publication Data

US 2002/0017633 A1 Feb. 14, 2002

(30) Foreign Application Priority Data

Mar. 16, 2000 (EP) .............................. 00105618

(51) Int. Cl.⁷ ................................................ C09K 19/02
(52) U.S. Cl. ................. 349/183; 349/182; 252/299.01; 252/299.5
(58) Field of Search .................. 349/183, 182; 252/299.5, 299.01; 428/1.1, 402; 427/212, 218; 430/20

(56) References Cited

U.S. PATENT DOCUMENTS 5,619,352 A    4/1997    Koch et al.

FOREIGN PATENT DOCUMENTS

| EP | 0 601 483 | 6/1994 |
|----|-----------|--------|
| WO | WO 95/16007 | 6/1995 |
| WO | WO 96/17901 | 6/1996 |
| WO | WO 97/27252 | 7/1997 |
| WO | WO 97/35219 | 9/1997 |
| WO | 97/35219 * | 9/1997 |
| WO | WO 99/02340 | 1/1999 |

\* cited by examiner

Primary Examiner—Alexander Ghyka
(74) Attorney, Agent, or Firm—Millen, White, Zelano & Branigan, P.C.

(57) ABSTRACT

Liquid crystal pigments comprising at least one layer of liquid crystalline polymer material with a helically twisted molecular structure wherein the helical axis is oriented substantially perpendicular to the plane of the layer and which show reflection of circularly polarized light, some prepared in which the bandwidth of the reflected wavelength band is at least 100 nm. These pigments are suitable for use in reflective films or coatings for decorative applications, cosmetic compositions, and pharmaceutical compositions, optical elements, and security applications.

28 Claims, 1 Drawing Sheet

BROADBAND LIQUID CRYSTAL PIGMENTS

FIELD OF THE INVENTION

The invention relates to liquid crystal pigments, to methods of their preparation and to their use in reflective films or coatings, for decorative purposes, cosmetic and pharmaceutical compositions, optical elements and security applications.

BACKGROUND AND PRIOR ART

In prior art platelet shaped liquid crystal pigments are known which comprise a layer of prealigned polymerized cholesteric liquid crystal (CLC) material, wherein the cholesteric helix is oriented perpendicular to the plane of the layer. These pigments show selective reflection of visible light that is circularly polarized, caused by interaction of incident light with the helically twisted structure of the CLC material. The central wavelength of reflection $\lambda$ depends on the pitch p and the average refractive index n of the CLC material according to the equation $$\lambda = n \cdot p$$

Due to the platelet shape of the pigments, the effective helical pitch of the CLC layer that interacts with incident light, and thereby the wavelength of the reflected light, vary depending on the viewing angle. This results in a colour flop of the reflection colour of the pigment when being viewed at different angles. This angle dependent colour effect is exploited in many applications, such as decorative uses like inks or lacquers e.g. for car bodies, or security uses like non-forgeable security markings for documents of value.

Platelet shaped CLC pigments are typically produced by coating a thin layer of a polymerizable or crosslinkable CLC material onto a substrate, aligning the CLC material to achieve uniform orientation of the helical axis perpendicular to the plane of the layer, and curing the CLC material for example by UV irradiation. The cured film is then ground to yield small platelet shaped flakes.

For practical use in inks or lacquers, the CLC pigments are usually dispersed in a light transmissive binder. The inks or lacquers can then be used at room temperature without the need of further alignment.

Platelet shaped CLC pigments with viewing angle dependent colour as described above are disclosed for example in EP 0 601 483 and WO 97/27252.

The pigments disclosed in the above mentioned documents, however, reflect only a narrow waveband of light. Therefore, in order to obtain inks or lacquers with mixed or white colour characteristics which are desired for specific applications, it is necessary to mix together pigments with different primary colours which have to be fabricated separately.

A more time and cost effective way would be to use LC pigments that directly show mixed or white colour characteristics. This can be achieved by providing LC pigments with a broadened bandwidth of the reflected wavelength band, which covers a substantial part of the visible spectrum or, in case of white colour, even covering the entire visible spectrum.

WO 99/02340 discloses cholesteric pigment flakes with a broadened bandwidth of the reflected waveband. These pigments comprise a bilayer of polymerized CLC material. Each layer exhibits a non-linear pitch distribution throughout its thickness direction, and as a result shows reflection of a broad wavelength band with asymmetrical reflection characteristics. The pitch gradient is achieved by mixing together a cholesteric polymerizable or crosslinkable liquid crystal material and a nematic non-polymerizable liquid crystal material, coating the mixture onto a substrate, annealing the mixture to achieve planar alignment and curing the mixture e.g. by UV irradiation. Upon curing of the mixture phase segregation of the non-polymerizable nematic material and the polymerized cholesteric material occurs, leading to a pitch distribution, including regions with high pitch and regions with low pitch, within the material.

The pigments according to WO 99/02340 are obtained by laminating together two similar single layers of CLC material with non-linear pitch distribution and asymmetrical reflection characteristics in such a manner that the resulting bilayer has symmetrical reflection characteristics. This is achieved by laminating the two single layers together such that their surfaces with similar reflection characteristics are facing each other.

The pigments according to WO 99/02340, however, have several drawbacks. Thus, the preparation of the single CLC layers with non-linear pitch distribution is complicated and time consuming, since it relies on a phase segregation process which involves material diffusion within the CLC layer during polymerization. Furthermore, due to the bilayer structure of the CLC pigments their manufacture is complicated because an extra lamination step is needed. Furthermore, the resulting pigments have a high thickness, which is disadvantageous for many applications where thin pigments or coatings are required.

SUMMARY OF THE INVENTION

It was therefore an aim of the present invention to provide broadband liquid crystal pigments which do not have the disadvantages of prior art as discussed above. Another aim of the present invention was to provide methods of manufacturing broadband liquid crystal pigments which are especially suitable for mass production. Other aims of the present invention are immediately obvious to the expert from the following description.

It was found that the above aims can be achieved by providing broadband liquid crystal pigments according to the present invention.

Definition of Terms

In connection with liquid crystal pigments and reflective films or coatings as described in the present application, the following definitions of terms as used throughout this application are given.

The term 'liquid crystal or mesogenic material' or 'liquid crystal or mesogenic compound' should denote materials or compounds comprising one or more rod-shaped, board-shaped or disk-shaped mesogenic groups, i.e.groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'helically twisted structure' refers to anisotropic, in particular liquid crystal materials that exhibit a chiral mesophase, wherein the mesogens are oriented with their main molecular axis twisted around a helix axis, like e.g. a chiral nematic (=cholesteric) or a chiral smectic phase. Materials exhibiting a chiral nematic phase or a chiral smectic C phase are preferred. Particularly preferred are materials exhibiting a cholesteric phase.

In these materials, the definition of the helix axis to be 'oriented substantially perpendicular to the film/layer plane' also includes orientations where the helix axis is tilted at an angle of up to 2° relative to the direction perpendicular to the film/layer plane.

The term 'film' includes self-supporting, i.e. free-standing, films that show more or less pronounced mechanical stability and flexibility, as well as coatings or layers on a supporting substrate or between two substrates.

The term 'pigments' as used in the present invention comprises small size particles with dimensions of 1 μm to 2 mm. These particles can be granules of a symmetric or unsymmetric shape as well as platelets having average lateral dimensions several times larger than the thickness, or mixtures of both platelets and granules. Platelet shaped flakes typically show a high dependence of the reflection wavelength on the viewing angle, whereas in granular or spherical flakes usually the viewing angle dependence of the reflection wavelength is lower.

One object of the present invention is to provide liquid crystal pigments comprising at least one layer of anisotropic or liquid crystalline polymer material with a helically twisted molecular structure wherein the helical axis is oriented substantially normal to the layer and showing reflection of circularly polarized light, characterized in that the bandwidth of the reflected wavelength band is at least 100 nm.

Another object of the present invention is the use of liquid crystal pigments according to the present invention in reflective films or coatings, for decorative purposes, optical elements and security applications.

Another object of the present invention is the use of liquid crystal pigments according to the present invention as effect pigments in paints, printing inks, spray paints, cosmetic products or coloured plastics, and for active and passive optical elements and security applications.

Another object of the present invention is a reflective film or coating comprising at least one liquid crystal pigment according to the present invention in a transmissive binder.

Another object of the present invention is a security marking or device comprising at least one pigment, reflective film or coating according to the present invention.

Upon further study of the specification and appended claims, further objects and advantages of this invention will become apparent to those skilled in the art.

Preferred embodiments of the present invention relate to broadband liquid crystal pigments wherein the pigments reflect circularly polarized light of a single handedness, the bandwidth of the reflected waveband is larger than 220 nm, particularly preferably larger than 320 nm, very particularly preferably larger than 420 nm, the reflected waveband covers the spectrum of wavelengths from 450 to 750 nm, the reflected waveband covers the visible spectrum of light, the reflection characteristics, in particular the reflected colours, are substantially independent from the viewing angle, the helical pitch within the layer of liquid crystalline polymer material varies asymmetrically in a direction perpendicular to the layer, the helical pitch within the layer of liquid crystalline polymer material varies from a minimum value at one surface of the layer to a maximum value at the opposite surface of the layer, the helical pitch within the layer of liquid crystalline polymer material varies symmetrically in a direction perpendicular to the layer, the helical pitch within the layer of liquid crystalline polymer material varies from a maximum value in the central region of the layer to minimum values at each of the surfaces of the layer, the liquid crystalline polymer material forms a three-dimensional network, the thickness is from 0.1 to 100 μm and the lateral dimensions are from 1 to 1000 μm, Especially preferred are broadband LC pigments having a silver or gold appearance.

Broadband LC pigments according to the present invention that cover a substantial part of the visible spectrum or the entire visible spectrum of light are characterized in that they do not show, or do only show to a minor extent, a colour flop like the narrowband LC pigments of prior art. However, they still have cholesteric properties such as the reflection of circularly polarized light.

The inventive LC pigments are therefore particularly useful for use in films or coatings as false-proof security marking e.g. on documents of value or other security devices, when a colour effect is not desired.

Thus, a preferred embodiment of the present invention relates to a reflective film or coating comprising inventive LC pigments that reflect a broad waveband of circularly polarized light of a single handedness and are dispersed in an optically isotropic light transmissive binder.

For example, inventive silver or gold pigments reflecting either right-handed or left-handed circularly polarized light can be dispersed into a light transmissive binder and coated onto a substrate, e.g. a document or security device that is preferably covered with a black layer. The black layer, however, is not necessarily required. When observed under unpolarized light, the coated pigments will have a silver or gold appearance. When observed under the two different handednesses of circularly polarized light, the pigments will appear bright under one handedness and dark under the other handedness. Thereby, authentification of the document or identification of a hidden pattern, formed by regions with different handedness, can be achieved.

Pigments reflecting either of the two handednesses of circularly polarized light can be prepared by using a polymerizable CLC starting material with enantiomerically pure chiral compounds.

Furthermore, the reflective film or coating comprising the inventive LC pigments can be covered with a quarter wave retardation film or layer (QWF). The light reflected from the film or coating and passing the QWF will then be linearly polarized. Thus, when using such a film or coating as security marking, authentification can be achieved by observation under linearly polarized light.

For example, a layer of gold pigments coated on a black substrate and covered with a QWF, if viewed through a rotating linear polarizer, would appear gold in a first polarization direction and black in a polarization direction perpendicular to the first direction.

For some applications, it is preferable to use mixtures of flakes with different reflection maxima. Thus, it is also possible to mix two or more different inventive broadband pigments with different reflection characteristics, e.g different reflection maxima, together e.g. in a transmissive binder.

Thus, an image can be created on a substrate by a combination of flakes with different reflection characteristics.

A particularly preferred embodiment of the present invention relates to a reflective film or coating comprising at least two different inventive pigments that reflect circularly polarized light of substantially the same waveband but of opposite handednesses.

When using such a mixture of pigments in a reflective film or coating, a pattern or image can be created that is invisible when observed under unpolarized light, but visible when observed under circularly polarized light, or, if covered with a QWF, when observed under linear polarized light.

Another preferred embodiment of the present invention relates to pigments that reflect wavelengths in the UV range, preferably from 200 to 440 nm. Such pigments are useful for example for the preparation of optical films like reflective UV polarizers or compensators. In particular, optical films of anisotropic polymer material reflecting UV light have been reported to show optical negative C symmetry, as described in U.S. Pat. No. 5,619,352, and can therefore be used as negative C compensators for viewing angle compensation in liquid crystal displays.

UV-reflecting inventive liquid crystal pigments are also suitable for use in cosmetic and pharmaceutical compositions, for example for coloured make-up as described in EP 815 826, or as UV-filters for the protection of human skin or hair, in particular protection against UV-A and UV-B-radiation, as described for example in DE 196 29 761 or EP 1 038 941. Since the inventive pigments have a broad reflection bandwidth, they can be used as broadband UV-filters e.g. reflecting at the same time UV-A and UV-B or UV-B and UV-C rays.

A broadband liquid crystal pigment comprising a chiral compound of formula I and reflecting UV light, in particular of a wavelength of 200 to 400 nm, is another object of the invention. Another object is a cosmetic composition, in particular a cosmetic or pharmaceutical composition for protection of human skin or hair, comprising as UV-filter one or more broadband liquid crystal pigments reflecting UV light, in particular in a wavelength range of 200–440 nm, especially 280–400 nm or 200–330 nm (UV-B).

The inventive pigments can be prepared from a broadband reflective CLC polymer film with a broad reflection waveband, which is then ground to small pigment flakes of the desired dimensions.

The preparation of a broadband reflective CLC polymer film is known in prior art, where these films are used as broadband reflective polarizers, or broadband circular polarizers, and is described in EP 0 606 940, WO 96/02016, WO 97/35219 and the non-prepublished EP99115172, the entire disclosure of which is incorporated into this application by way of reference.

The pigments according to the present invention are preferably prepared by the following method
a) coating a thin layer of a polymerizable CLC material onto a substrate or between two substrates,
b) aligning the polymerizable CLC material in the coated layer into a uniform orientation,
c) polymerizing said polymerizable CLC material by exposure to heat or actinic radiation,
d) optionally removing the substrate, or, if two substrates are present, one or both of the substrates from the polymerized material,
e) grinding the polymer film into small particles of the desired dimensions.

To induce the chiral phase behaviour in the polymerizable mesogenic material, for example a mixture comprising an achiral and a chiral mesogenic polymerizable compound can be used. For example, to induce cholesteric phase behaviour, a chiral nematic and an achiral nematic polymerizable compound are used. The chiral nematic compound brings about the helically twisted cholesteric phase structure.

Since the pitch of the cholesteric helix is dependent on the chemical constitution and the concentration of the chiral compound, the wavelength of the reflection maximum and therewith the colour properties of the flakes can be controlled directly in the production process just by varying the type and the ratio of the chiral mesogenic compound. Thus tailor-made pigment flakes with the desired colours can be prepared.

The ability of a chiral compound to induce a cholesteric structure with a certain helical pitch in a nematic host material is called its helical twisting power (HTP). If a compound with a high HTP is used, only a small amount is sufficient to achieve a cholesteric structure with reflection of visible light. In this case it is not necessary that the chiral compound exhibits a liquid crystal phase per se. It is sufficient that the mixture of the chiral and achiral compounds shows a liquid crystal phase.

In a preferred embodiment the polymerizable CLC mixture comprises at least one polymerizable mesogenic compound having two or more polymerizable functional groups (di- or multireactive or di- or multifunctional compound). Upon polymerization of such a mixture a three-dimensional polymer network is formed. A polymer film made of such a network is self-supporting and shows a high mechanical and thermal stability and a low temperature dependence of its liquid crystal properties. In the ideal case the liquid crystal properties of the polymer film are temperature independent.

By varying the concentration of the multifunctional mesogenic or non mesogenic compounds, the crosslink density of the resulting polymer film and thereby its physical and chemical properties such as the glass transition temperature, which is also important for the temperature dependence of the optical properties of the film, the thermal and mechanical stability or the solvent resistance can be tuned easily.

According to the desired application e.g. films of a higher brittleness can be made by increasing the amount of multifunctional component. A higher brittleness is desirable in particular when the polymer film is subsequently ground to small flakes.

A high brittleness can also be achieved by using compounds with more than two polymerisable groups which may be mesogenic or non mesogenic. Typical examples for non mesogenic monomers with more than two polymerisable groups are trimethylpropane-trimethacrylate or pentaerythritoltetraacrylate.

In a preferred embodiment of the present invention, the chiral polymerizable mesogenic material comprises at least one polymerizable mesogenic compound having one polymerizable functional group and at least one polymerizable mesogenic compound having two or more polymerizable functional groups.

In another preferred embodiment of the present invention the chiral polymerizable mesogenic material comprises at least one chiral polymerizable mesogenic compound and at least one achiral polymerizable mesogenic compound.

Since the polymerizable mixture may contain both polymerizable components with one (monofunctional) and with two or more polymerizable groups (multifunctional), polymerization and crosslinking are carried out in the same process.

Especially preferably the polymerizable CLC mixture comprises 5 to 100%, in particular 25 to 80%, very preferably 45 to 70%, by weight of multireactive mesogenic compounds. Direactive mesogenic compounds are particularly preferred.

The polymerizable components of the CLC material according to the present invention are preferably selected of formula I P—(Sp—X)$_n$—MG—R      I wherein
P is CH$_2$=CW—COO—, WCH=CH—O—, or CH$_2$=CH—Phenyl-(O)$_k$— with W being H, CH$_3$ or Cl and k being 0 or 1,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond,
n is 0 or 1,
MG is a mesogenic group, and
R is H, CN, halogen or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is denoting P—(Sp—X)$_n$—.
MG in formula I is preferably selected of formula II —A$^1$—Z$^1$—(A$^2$—Z$^2$—)$_m$—A$^3$—      II wherein
Z$^1$ and Z$^2$ are each independently —COO—, —OCO—, —CH$_2$CH$_2$—, —OCH$_2$—, —CH$_2$O—, —CH=CH—, —CH=CH—COO—, —OCO—CH=CH—, —C≡C—, or a single bond,
A$^1$, A$^2$ and A$^3$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, 1,4-bicyclo(2,2,2) octylene, piperidine-1,4-diyl, naphthalene-2,6-diyl, decahydronaphthalene-2,6-diyl, or 1,2,3,4-tetrahydronaphthalene-2,6-diyl, it being possible for all these groups to be unsubstituted, mono- or polysubstituted with F, Cl, OH, CN or NO$_2$ or alkyl, alkoxy or alkanoyl groups having 1 to 7 C atoms wherein one or more H atoms may be substituted by F or Cl, and
m is 0, 1 or 2.

A smaller group of preferred mesogenic groups of formula 11 is listed below. For reasons of simplicity, Phe in these groups is 1,4-phenylene, PheL is a 1,4-phenylene group which is substituted by 1 to 4 groups L, with L being F, Cl, OH, CN, NO$_2$ or an optionally fluorinated alkyl, alkoxy or alkanoyl group with 1 to 7 C atoms, and Cyc is 1,4-cyclohexylene. The following list of preferred mesogenic groups comprises the subformulae II-1 to II-24 as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the subformulae II-1, II-2, II-4, II-6, II-7, II-8, II-11, II-13, II-14, II-15 and II-16.

In these preferred groups Z in each case independently has one of the meanings of Z$^1$ as given in formula 1. Preferably Z is —COO—, —OCO—, —CH$_2$CH$_2$—, —C≡C— or a single bond.

Very preferably the mesogenic group MG is selected from the following formulae and their mirror images

IIg or

IIh furthermore

IIi

IIk with L having each independently one of the meanings given above.

Particularly preferred are the subformulae IId, IIg, IIh, IIi, IIk and IIo, in particular the subformulae IId and IIk.

IIm

L is preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, in particular F, Cl, CN, $CH_3$, $C_2H_5$, $OCH_3$, $COCH_3$ and $OCF_3$, most preferably F, Cl, $CH_3$, $OCH_3$ and $COCH_3$.

IIn

In another preferred embodiment of the present invention the polymerizable mixture comprises at least one chiral polymerizable compound of formula I comprising a group MG having at least one center of chirality. In these compounds MG is preferably selected according to the following formulae

IIo $$—(A^1—Z^1)_a—G^1— \qquad \text{II*-1}$$

$$—(A^1Z^1)_a—G^2—(Z^1—A^2)_b— \qquad \text{II*-2}$$

wherein L has the meaning given above and r is 0, 1 or 2.

The group in these preferred formulae is very preferably denoting

, , wherein

$A^1$, $A^2$ and $Z^1$ have the meaning given in formula II,
a and b are independently of each other 0, 1 or 2,
—$G^1$— together with R in formula I forms a terminal chiral group, such as for example a cholesteryl group, a terpenoid radical, like e.g. disclosed in the WO 96/17901, particularly preferably a menthyl group, or a terminal chiral sugar derivative comprising a mono- or dicyclic radical with pyranose or furanose rings like, for example, a terminal group derived from the chiral sugars or sugar derivatives as disclosed e.g. in the international application WO 95/16007,
and $G^2$ in formula II*-2 is a bivalent chiral group, like for example a (S,S)- or (R,R)-hydrobenzoin group or a bivalent chiral sugar, sugar derivative or another bivalent chiral radical, as disclosed e.g. in the international application WO 95/16007, especially preferably a group based on 1,4:3,6-Dianhydro-D-sorbitol:

In case $G^2$ is a group based on 1,4:3,6-Dianhydro-D-sorbitol as shown above, $Z^1$ in formula II*-2 is preferably denoting —CH═CH— and/or R in formula I is preferably different from P—(Sp—X)$_n$—.

If R in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

Halogen is preferably F or Cl.

R in formula I can be a polar or an unpolar group. In case of a polar group, R is selected from CN, NO$_2$, halogen, OCH$_3$, OCN, SCN, COR$^1$, COOR$^1$ or a mono-, oligo- or polyfluorinated alkyl or alkoxy group with 1 to 4 C atoms.

$R^1$ is optionally fluorinated alkyl with 1 to 4, preferably 1 to 3 C atoms. Especially preferably polar groups R are selected of F, Cl, CN, NO$_2$, OCH$_3$, COCH$_3$, COC$_2$H$_5$, COOCH$_3$, COOC$_2$H$_5$, CF$_3$, C$_2$F$_5$, OCF$_3$, OCHF$_2$, and OC$_2$F$_5$, in particular of F, Cl, CN, OCH3 and OCF$_3$.

In case of an unpolar group, R is preferably alkyl with up to 15 C atoms or alkoxy with 2 to 15 C atoms.

R in formula I can be an achiral or a chiral group. In case of a chiral group it is preferably selected according to the following formula III:

wherein
X$^1$ is —O—, —S—, —CO—, —COO—, —OCO—, —OCOO— or a single bond,
Q$^1$ is an alkylene or alkylene-oxy group with 1 to 10 C atoms or a single bond,
Q$^2$ is an alkyl or alkoxy group with 1 to 10 C atoms which may be unsubstituted, mono- or polysubstituted by halogen or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another,
Q$^3$ is halogen, a cyano group or an alkyl or alkoxy group with 1 to 4 C atoms different from Q$^2$,
wherein the chiral group of formula III has up to 25 C atoms.

In case Q$^1$ in formula III is an alkylene-oxy group, the O atom is preferably adjacent to the chiral C atom.

Preferred chiral groups R are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy for example.

In addition, compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Another preferred embodiment of the present invention relates to compounds of formula I wherein R is denoting P—(Sp—X)$_n$—.

P in formula I is preferably an acrylate group, a methacrylate group, a vinyl or vinyloxy group, an epoxy group, a styrene group or a propenyl ether group, in particular an acrylate, methacrylate, vinyl or epoxy group.

As for the spacer group Sp in formula I all groups can be used that are known for this purpose to the skilled in the art.

The spacer group Sp is preferably a linear or branched alkylene group having 1 to 25 C atoms, preferably 1 to 20 C atoms, in particular 1 to 12 C atoms, in which, in addition, one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)—, —CH(CN)—, —CH=CH— or —C≡C—.

Typical spacer groups are for example —$(CH_2)_o$—, —$(CH_2CH_2O)_p$—$CH_2CH_2$—, —$CH_2CH_2$—S—$CH_2CH_2$— or —$CH_2CH_2$—NH—$CH_2CH_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyl-iminoethylene, 1-methylalkylene, ethenylene, propenylene and butenylene for example.

Especially preferred are inventive compounds of formula I wherein Sp is an alkylene or alkyleneoxy group with 2 to 8 C atoms. Straight-chain alkyl or alkoxy groups are especially preferred.

In another preferred embodiment of the invention the chiral compounds of formula I comprise at least one spacer group Sp that is a chiral group of the formula IV:

IV wherein
$Q^1$ and $Q^3$ have the meanings given in formula III, and
$Q^4$ is an alkylene or alkylene-oxy group with 1 to 10 C atoms or a single bond, being different from $Q^1$.

In case $Q^1$ in formula III is an alkylene-oxy group, the 0 atom is preferably adjacent to the chiral C atom.

In the event that R is P—Sp—X—, the two spacer groups Sp in the compounds of formula I may be identical or different.

Of the preferred compounds described above particularly preferred are those wherein n is 1.

Further preferred are compounds comprising both a group P—(Sp—X)$_n$— wherein n is 0 and a group P—(Sp—X)$_n$— wherein n is 1.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Examples of suitable polymerizable mesogenic compounds that can be used as components of the polymerizable CLC material, are disclosed for example in WO 93/22397; EP 0,261,712; DE 195,04,224; WO 95/22586 and WO 97100600. The compounds disclosed in these documents, however, are to be regarded merely as examples that shall not limit the scope of this invention.

Preferably the polymerizable CLC mixture comprises at least one polymerizable mesogenic compound having one polymerizable functional group and at least one polymerizable mesogenic compound having two or more polymerizable functional groups.

Examples of especially useful monoreactive chiral and achiral polymerizable mesogenic compounds are shown in the following list of compounds, which should, however, be taken only as illustrative and is in no way intended to restrict, but instead to explain the present invention:

(Vh)

(Vi)

(Vk)

(Vm)

wherein, P has one of the meanings of formula I and its preferred meanings as mentioned above, x is an integer from 1 to 12, A is 1,4-phenylene or 1,4-cyclohexylene, v is 0 or 1, Y is a polar group as defined above, $R^0$ is an unpolar alkyl or alkoxy group, Ter is a terpenoid radical like e.g. menthyl, Chol is a cholesteryl group, and $L^1$ and $L^2$ are each independently H, F, Cl, CN, OH, $NO_2$ or an optionally halogenated alkyl, alkoxy or carbonyl group with 1 to 7 C atoms.

The term unpolar group in this connection preferably denotes an alkyl group with 1 or more, preferably 1 to 15 C atoms or an alkoxy group with 2 or more, preferably 2 to 15 C atoms.

Examples of useful direactive chiral and achiral polymerizable mesogenic compounds are shown in the following list of compounds, which should, however, be taken only as illustrative and is in no way intended to restrict, but instead to explain the present invention (VIa)

(VIb)

(VIc)

(VId)

(VIe)

wherein P, x, D, $L^1$ and $L^2$ have one of the meanings given above and y is an integer from 1 to 12 which is the same as or different from x.

A polymerizable CLC material according to the first preferred embodiment as described above comprises one or more chiral dopants which themselves do not necessarily have to show a liquid crystalline phase and give good planar alignment themselves, in particular non-polymerizable chiral dopants.

Especially preferred are chiral dopants with a high helical twisting power (HTP), in particular those disclosed in WO 98/00428. Further typically used chiral dopants are e.g. the commercially available S 101 1, R 811 or CB 15 (from Merck KGaA, Darmstadt, Germany).

Especially preferred are chiral non-polymerizable dopants selected from the following formulae The above chiral compounds of formula VII and VIII exhibit a very high helical twisting power (HTP), and are therefore particularly useful for the purpose of the present invention.

Preferably the polymerizable CLC material comprises one or more chiral mesogenic compounds that spontaneously exhibit planar aligment when coated onto a substrate, in particular polymerizable chiral compounds of this type. Preferably these compounds are selected of formula 1, wherein Sp and/or R comprise a chiral moiety. Particularly preferred are chiral compounds selected of the formula Va to Vm above.

Further preferred is a polymerizable CLC material comprising a surface active component comprising one or more surfactans.

Suitable surfactants are described for example in J. Cognard, Mol.Cryst.Liq.Cryst. 78, Supplement 1, 1–77

VII

VIII including the (R,S), (S,R), (R,R) and (S,S) enantiomers not shown, wherein E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

The compounds of formula VII and their synthesis are described in WO 98/00428. The compounds of formula VII and their synthesis are described in GB 2,328,207.

(1981). Particularly preferred are non-ionic surfactants, such as mixtures of non-ionic fluoroalkylalkoxylate surfactants selected from the following formulae $C_nF_{2n+1}SO_2N(C_2H_5)(CH_2CH_2O)_xCH_3$      IX $C_nF_{2n+1}(CH_2CH_2O)_xH$      X wherein n is an integer from 4 to 12 and x is an integer from 5 to 15. Upon using these surfactants it is possible to produce polymerized films with a low tilt angle in the range from 0 to 1 degrees, in particular 0 to 0.5 degrees. In the best case the tilt angle is approximately 0 degrees.

The surfactants of formula IX are commercially available under the trade name Fluorad 171 (from 3M Co.), the surfactants of formula X under the trade name Zonyl FSN (from DuPont).

In case surfactants are used, the CLC material contains preferably from 500 to 2500 ppm, in particular from 1000 to 2500 ppm, very preferably from 1500 to 2500 ppm of surfactants. Further preferred materials contain 0.01 to 5%, in particular 0.1 to 3%, very preferably 0.2 to 2% by weight of surfactants.

A particularly preferred polymerizable CLC mixture according to the first preferred embodiment comprises
A) 5 to 80%, very preferably 10 to 65% by weight of up to five, preferably one, two or three monoreactive mesogenic compounds having a polar terminal group,
B) 10 to 90%, very preferably 25 to 75% by weight of up to four, preferably one or two, direactive polymerizable mesogenic compounds,
C) 0.1 to 15%, very preferably 0.2 to 9% by weight of up to three, preferably one or two, non-polymerizable chiral dopants,
D) 0.5 to 10%, very preferably 1 to 7% by weight of a polymerization initiator,
E) 0 to 5%, very preferably 0.1 to 2% by weight of one or more surfactants.

The compounds of component A) are preferably selected from the above formulae Va and Vb.

The compounds of component B) are preferably selected from the above formulae VIa and VIb.

The chiral dopants of component C) are preferably selected from the above formulae VI I and VIII.

The surfactants of component E) are preferably selected from the above formulae IX and X.

According to the inventive method, the polymerizable CLC material is coated onto a substrate and aligned into a uniform orientation. It can then be subsequently polymerized or crosslinked to permanently fix the orientation of the cholesteric material.

As a substrate for example a glass or quartz sheet or a plastic film or sheet can be used. In case of polymerizable matetrials, the substrates can be removed after polymerization or not. In case the substrate is not removed from the polymerized film after polymerization, preferably an isotropic substrate is used.

Preferably the substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The CLC material can also be dissolved in a solvent, preferably in an organic solvent. The solution is then coated onto the substrate, for example by spin-coating or other known techniques, and the solvent is evaporated off. In most cases it is suitable to heat the mixture in order to facilitate the evaporation of the solvent.

In addition to the methods described above, planar alignment in the coated layer of the CLC material can further be enhanced by shearing the material, e.g. by means of a doctor blade. It is also possible to apply an alignment layer, for example a layer of rubbed polyimide or sputtered SiOX, on top of the substrate, or alternatively to directly rub the substrate, i.e. without applying an additional alignment layer.

For example rubbing can be achieved by means of a rubbing cloth, such as a velvet cloth, or with a flat bar coated with a rubbing cloth. In a preferred embodiment of the present invention rubbing is achieved by means of at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Polymerization of the polymerizable CLC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used. When curing polymerizable mesogens with vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable CLC mixture preferably comprises 0.01 to 10%, very preferably 0.05 to 5%, in particular 0.1 to 3% of a polymerization initiator. UV photoinitiators are preferred, in particular radical UV photoinitiators.

The curing time is dependent, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

It is also possible, in order to increase crosslinking of the polymers, to add up to 20% of a non mesogenic compound with two or more polymerizable functional groups to the polymerizable material, alternatively, or in addition to, the di- or multifunctional polymerizable mesogenic compounds, to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable CLC mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the CLC material.

In a preferred embodiment of the invention the polymerization of the polymerizable CLC mixture is carried out under an atmosphere of inert gas, preferably under a nitrogen atmosphere.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

In a preferred embodiment of the present invention, the pigment flakes are prepared from a broadband CLC film wherein the pitch varies symmetrically in a direction perpendicular to the film plane. The preparation of such a film is disclosed in WO 97/35219. In this way, platelet shaped pigments with a symmetrical variation of the pitch and reflection wavelength, e.g. blue—red—blue, throughout their thickness can be obtained.

In another preferred embodiment of the present invention, the CLC pigment flakes are prepared from a broadband CLC film wherein the pitch varies asymmetrically in a direction perpendicular to the film plane. The preparation of such a film is disclosed in EP 0 606 940 and WO 96/02016. In this way, platelet shaped pigments with an asymmetrical variation of the pitch and reflection wavelength, e.g. blue—red, throughout their thickness can be obtained.

Pigments with asymmetrical pitch variation can be made thinner compared to pigments with the same bandwidth and symmetrical pitch variation, because the former exhibit only one complete pitch gradient (e.g. blue—red) within the film thickness, whereas the latter exhibit two gradients (e.g. blue—red—blue). For example, compared to an asymmetric CLC polymer film having a thickness of about 10 microns, a symmetric CLC polymer film with approximately the same bandwidth would have a thickness of 15 to 20 microns.

Thus, in applications where thinner pigments are preferred, preferably pigments with an asymmetric pitch gradient are used. These pigments are also cheaper as they need less material.

A particularly preferred method of preparing a broadband CLC polymer film with asymmetrical pitch variation is described in the non-prepublished European Patent Application EP 99115172.1 filed by the inventors of the present invention.

According to the method described in EP 99115172.1, a broadband reflective CLC polymer film with asymmetrically varying pitch is prepared by polymerizing a polymerizable CLC material comprising
a) at least one polymerizable chiral or achiral mesogenic compound,
b) at least one chiral compound, which can be also be the compound of component a), d), e) or f),
c) at least one polymerization initiator,
d) optionally at least one crosslinking agent,
e) optionally at least one chain termination or chain transfer agent,
f) optionally a dye component comprising at least one dye,
wherein polymerization is carried out at a temperature where the polymerizable CLC material has a cholesteric phase and the resulting CLC polymer has a thermodynamically stable smectic phase.

Preferably the polymerizable CLC material used in this method has a cholesteric phase and an additional smectic phase, preferably a smectic A phase, at temperatures below the cholesteric phase.

Upon polymerization of the CLC material according to EP 99115172.1 its liquid crystal phase range will be increased and the phase transition temperatures of the polymer will be shifted to higher temperatures. Thus, there is an temperature or temperature region where the polymerizable material ('monomer') exhibits a cholesteric phase and the polymerized material ('polymer') exhibits still a smectic phase, as depicted in the scheme below.

If the polymerizable CLC material according to the above scheme is polymerized at a temperature where the polymerized CLC material exhibits a smectic phase (e.g. at the temperature $T_P$ in the above scheme), the pitch of the cholesteric helix will unwind in the forming polymer as the smectic phase will be approached.

However, when the CLC material is polymerized quickly, e.g. by UV irradiation in bulk, the mesogens in the CLC material do not have enough time to relax to give the thermodynamically stable, more highly ordered smectic phase of the polymer, but instead the orientation that the polymerizable CLC material had before curing becomes fixed and remains frozen in for extended periods.

Thus, if a sample of a polymerizable CLC material as shown in the above scheme is polymerized at a rate much faster than the time required for unwinding the helix, the sample remains fixed in the cholesteric state due to the high viscosity of the polymer formed, which prevents relaxation into the (thermodynamically more stable) smectic phase.

If, however, the molecular weight of the forming polymer is reduced or kept small during polymerization, the viscosity of the polymer will also be reduced. This allows some unwinding of the helix before polymerization is complete, and therefore leads to an increase of the pitch and thus to a shift of the reflection wavelength to higher wavelengths. As explained above, unwinding can also be enhanced if polymerization occurs slowly.

According to the method described in EP 99115172.1, the molecular weight of the forming polymer and the degree and speed of polymerization, and thereby the shift of pitch and reflection wavelength in the reflective polymer film, are controlled by varying the amount and type of photoiniator c), and/or crosslinking component d), and/or chain transfer or chain termination agent e) in the polymerizable CLC material.

Suitable compounds for components a), b), c) and d) are described above. The compounds of component a), b) and optionally d) are selected such that the polymerizable CLC material has a cholesteric phase at a temperature where the resulting CLC polymer has a thermodynamically stable smectic phase.

By adding a selected amount of one or more chain transfer or chain termination agents e) to the polymerizable CLC material, the length of the free polymer chains and/or the length of the polymer chains between two crosslinks in the forming CLC polymer film can be controlled. When the amount of the chain transfer agent is increased, the polymer chain length and thus the molecular weight of the forming polymer are decreased. This reduces the viscosity of the forming polymer, and thus leads to faster relaxation of the polymeric precursor during polymerization and thereby to an unwinding of the cholesteric helix.

Thus the wavelength of the reflection band increases with increased concentration of the chain transfer agent. This holds at least for small concentrations of the chain transfer agents of typically 0 to 10%.

Preferably the polymerizable CLC material comprises 0.01 to 15%, in particular 0.1 to 10%, very preferably 0.5 to 5% of a chain transfer agent.

As a chain transfer agent any compound known to the expert can be used. Preferably thiol compounds are used as chain terminator, for example monofunctional thiol compounds like e.g. dodecane thiol $CH_3(CH_2)_{11}SH$ or multi-functional thiol compounds like e.g. trimethylpropane tri(3-mercaptopropionate).

Preferably liquid crystalline or at least mesogenic thiol compounds are used due to their better solubility in liquid crystal hosts. Suitable chain transfer agents for the instant invention are amongst others especially those disclosed in WO 96/12209 and WO 96/25470, the entire disclosure of which is incorporated into this application by way of reference.

Especially preferred are liquid crystalline thiol compounds of formula XI and XII

XI

XII

Furthermore, by adding a selected amount of a crosslinking agent d) to the polymerizable CLC mixture the molecular weight and the degree of crosslinking of the polymer are increased, which also leads to a faster increase of the viscosity of the polymer. This suppresses the unwinding of the molecular helix and leads to a reflective film with a smaller reflection wavelength. Thus, by increasing the amount of crosslinking agent d) a decrease of the reflection wavelength in the reflective film is achieved.

However, the amount of crosslinking agent d) should not be too high, because high amounts of crosslinker lock the structure of the forming polymer too quickly and thus reduce the bandwidth of the reflective film.

The use of a crosslinking agent d) is also recommendable in order to reduce the influence of temperature on the performance of the cured polymer film, since crosslinked polymers show higher stability against temperature variation than linear polymers. Crosslinked films are also advantageous for use in pigments as they are solid, self supporting films.

Due to their better solubility in liquid crystalline mixtures, here especially di- or multireactive compounds that are mesogenic or even liquid crystalline are preferred.

Especially preferred for use as crosslinking agents d) are compounds of formula VIa and VIb above.

The concentration of the crosslinking agent component d) in the polymerizable CLC material is preferably from 0 to 35%, in particular from 2 to 25%, very preferably from 15 to 25%.

Furthermore, the pitch variation in the reflective CLC polymer film can be controlled by adding a dye component f) to the polymerizable material. When adding a dye that absorbs actinic radiation used for polymerization, the mixture at the surface of the film facing away from the radiation source will polymerize differently compared to the mixture at the surface of the film facing the radiation source, thus producing a pitch gradient very quickly, ideally within a minute or faster.

Therefore, the use of a dye, in particular in thicker films, allows to increase the bandwidth of the light reflected by the reflective film. Thus broadband reflective CLC polymer films both with a controlled gradient of the helical pitch (leading to a controlled bandwidth) and with a controlled central wavelength of the reflection band are accessible.

In a preferred embodiment the polymerizable CLC mixture contains 0 to 20%, preferably 0.1 to 10%, in particular 0.5 to 5% by weight of a dye component f) having an absorption maximum adjusted to the wavelength of the actinic radiation used for polymerization. The dye should preferably have its maximum absorption in the same wavelength range as the polymerization initiator. Preferably, a dye is used whose absorption maximum lies outside the reflection wavelength range of the reflective film in order to exclude undesired absorptions during the use of the film.

As an example of a suitable dye, 4,4'-azoxy anisole of the formula or the commercially available Merck Phase 5 (from Merck KGaA, Darmstadt, Germany) can be used. Furthermore, commercially available UV dyes such as Tinuvin (from Ciba Geigy, Switzerland) can be used.

In another preferred embodiment of the invention the polymerizable CLC mixture contains no dye.

Furthermore, the reflection bandwidth and the central reflection wavelength are controlled by variation of the irradiation power of the actinic radiation used for polymerization.

For example, when polymerizing a cholesteric and smectic, or smectogenic, polymerizable mesogenic mixture by irradiation with UV light, e.g. with a UV lamp, decreasing lamp power will lead to a lower polymerization rate. This gives the helix more time to unwind as the smectic phase of the polymer is approached, and thus leads to an increase of the helical pitch and the reflection wavelength.

The curing power is inversely proportional to the wavelength of the reflected light for the inventive method. For example, curing with high power leads to films reflecting blue light, whereas with decreasing power the colour of the reflected light can be shifted through green, yellow and red. Thus, the central wavelength of the reflected waveband can be altered by varying the curing power.

Flakes can be formed by grinding the cured polymer film, for example by means of a pestle and mortar or by using a mechanised grinder or mill. By additional cooling to temperatures below 0° C. the polymer brittleness is increased and grinding is made easier. The resulting powder is then sieved to give pigment flakes of the desired size.

A preferred method to produce flakes of spherical shape with dimensions smaller than 100 $\mu$m is grinding with a pestle and mortar by hand or in a mechanised mortar mill.

Another method to produce more or less spherical flakes is by milling the polymer film in a ball mill. Depending on the size and the weight of the balls, particles with average dimensions of less than 100 $\mu$m, in particular of 5 to 10 $\mu$m can be obtained.

Another preferred method is milling the polymer film under cooling in a blade mill. This produces a powder of platelet shaped flakes with lateral dimensions from several hundreds of microns to 1 to 2 mm. These flakes can subsequently be ground further in a mortar to give platelets with lateral dimensions smaller than 100 $\mu$m.

Cooling of the sample during grinding or milling can be achieved for example by using a carbon dioxide/aceton bath. Another preferred method of cooling is the addition of dry ice powder or liquid nitrogen to the sample.

In some embodiments it is preferable to add an antistatic agent when milling the polymer material to avoid agglomeration of the particles.

Apart from the method described above, the following methods are preferred to produce chiral polymer flakes according to the invention:

Coating the chiral polymerizable mesogenic material onto a substrate which contains shallow indentations with a diameter of 10 to 100 $\mu$m, preferably 20 to 50 $\mu$m and a depth of 3 to 20 $\mu$m, preferably 4 to 10 $\mu$m. In this case the act of coating causes sufficient shear to give uniform alignment. In order to increase the quality of the alignment the material may additionally be sheared for example by means of a doctor's blade or by applying a second substrate on top of the coated material as described above.

Gravure printing the chiral polymerizable mesogenic material in the shape of small droplets onto a substrate, for example a polyester web, using a gravure printing plate to leave droplets with a thickness of e.g. 3 to 20 $\mu$m, preferably 4 to 10 $\mu$m and a diameter of e.g. 10 to 100 $\mu$m, preferably 20 to 50 $\mu$m. The act of printing causes sufficient shear to give uniform alignment, however, here also the material may be additionally aligned by shearing with for example a doctors blade or by applying a second substrate on top of the droplets.

Spraying of the chiral polymerizable mesogenic material into an $N_2$ atmosphere to give small droplets with a diameter of 10 to 100 $\mu$m, which are cured by irradiation with strong UV light. The cured droplets may subsequently be ground to make smaller flakes.

Coating the chiral polymerizable mesogenic material onto a rotating drum, aligning by a knife edge, curing by irradiation with UV light and scraping off the cured polymer to yield small flakes.

Coating the chiral polymerizable mesogenic material onto a rotating drum containing dimples with a depth of e.g. 2 to 20 $\mu$m, preferably 3 to 10 $\mu$m and a diameter of e.g. 10 to 100 $\mu$m, preferably 20 to 50 $\mu$m, curing by UV irradiation and peeling off the drum.

Coating the chiral polymerizable mesogenic material onto a rotating drum containing stripes that are e.g. 2 to 20 $\mu$m, preferably 3 to 10 $\mu$m deep and e.g. 10 to 100 $\mu$m, preferably 20 to 50 $\mu$m across, aligning and curing as described above. After this the stripes are ground into fragments of the desired size.

Making an emulsion of the chiral polymerizable mesogenic material in an immiscible liquid and polymerising the droplets by heating or UV irradiation.

Adding a surfactant to the chiral polymerizable mesogenic material and blowing $N_2$ gas in to make a foam which is polymerized, scraped off and ground.

Extruding the chiral polymerizable mesogenic material under pressure through one or more slots with a width of e.g. 2 to 20 $\mu$m, preferably 3 to 10 $\mu$m, whereby the shearing produces good uniform alignment. The film is cured in an $N_2$ atmosphere.

Another preferred method uses a solid particle, preferably carbon black or graphite dipersed in a solution of the chiral polymerizable mesogenic material and two solvents. Solvent 1 does not dissolve the chiral polymerizable mesogenic material but solvent 2 does. Solvent 2 is boiled off and the precipitating chiral polymerizable mesogenic material forms a coating over the carbon particle which is then polymerised. This method produces particularly bright flakes.

Further preferred methods and examples for the preparation of pigment flakes can be taken from WO 97/30136, WO 98/42799, WO 97/27252 and WO 99/11719, the entire disclosure of which is incorporated into this application by way of reference.

The flakes obtained by the above mentioned methods have dimensions from 1 to 100 $\mu$m. It is also possible, however, to chose the process parameters so that flakes with dimensions larger than 100 $\mu$m, preferably from 0.5 mm to 1.5 mm, are obtained. These flakes show particularly striking colour effects and are preferred in certain applications.

Platelet shaped pigment flakes are preferred, wherein the aspect ratio, which describes the ratio of lateral dimensions to thickness, is larger than 3:1, in particular from 3:1 to 20:1, very preferably from 5:1 to 10:1.

In case of platelet shaped pigments, the thickness is preferably 1 to 50 $\mu$m, in particular 1 to 25 $\mu$m, very preferably 1 to 10 $\mu$m. The diameter of these pigments is preferably from 1 to 50 $\mu$m.

Further preferred are pigments with a granular shape, wherein the aspect ratio is less than 10:1, particularly less than 3:1, especially preferably wherein thickness, length and width are approximately the same. In these pigments, the diameter is preferably from 1 to 50 $\mu$m.

For the use in inks and paints, the cholesteric pigment flakes can be dispersed in a transparent binder or fluid, or incorporated into plastics, depending on the application.

The inks and paints in addition to the inventive pigments may also comprise one or more binders, additional pigments or dyes, curing agents, dispersing agents, fillers and further conventional additives, all of which are known from the state of the art.

Thus, in addition to the inventive pigments, the inks, paints and lacquers may also comprise one or more dyes or pigments which are not chemically bound to the liquid crystalline polymer material. These dyes or pigments can be selected of conventional inorganic pigments, such as titanium dioxide, iron (III) oxide, iron oxide yellow, chromium oxide, iron blue, carbon black, or organic dyes or pigments like azo, metal complex and polycyclic dyes or pigments based e.g. on phthalocyanine, perylene, pyrrolopyrrol, polymethine or triphenylmethane. Furthermore, additional pigments can be selected from platetet shaped effect pigments like metal pigments e.g. of copper or aluminium, pearl luster or interference pigments of coated mica, aluminium or carbon black, metal oxide pigments or coated glass flakes.

Suitable binder systems are e.g. polyesters, alkyd resins, polyurethanes, (meth)acrylate copolymers and resins based on cellulose esters, which may also be dissolved or dispersed in an organic solvent. Alternatively, water soluble binders may also be used, like e.g. water soluble polymer selected from polyesters, poly(meth)acrylates and polyurethanes.

The coating comprising the inventive pigments and the transparent binder may also be covered by a second coating as clearcoating. Suitable methods and components are disclosed in WO 97/27252.

The cholesteric polymer flakes can be be used as effect pigments in spraying or printing inks or paints or coloured plastics for decorative applications or cosmetic products. Other important fields of application are the automotive use, active or passive optical elements, like e.g. optical films such as polarizers or compensators, and security applications, for example in false-proof security labels, markings or patterns for documents of value, such as ID cards, credit cards, tickets etc.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The following abbreviations are used to illustrate the liquid crystalline phase behavior of the compounds: K=crystalline; N=nematic; S=smectic; Ch=cholesteric; I=isotropic. The numbers between the symbols indicate the phase transition temperatures in ° C.

The entire disclosure of all applications, patents and publications, cited above and below, and of corresponding European Patent application No. 00 105 618.3 filed Mar. 16, 2000 is hereby incorporated by reference.

EXAMPLES

Example 1
Preparation of a Broadband Cholesteric Film

The following polymerizable mixture was prepared

| Compound (1) | 65.0% |
| Compound (2) | 18.34% |
| Compound (3) | 15.0% |
| Compound (4) | 1.2% |
| TPO | 0.4% |
| Irgacure 1076 ® | 0.06% |

(1)

(2)

(3)

(4)

Compound (1) is described in DE 195 04 224. Compound (2) can be prepared in analogy to the methods described in WO 93/22397. Compound (3) is described in WO 98/00428. TPO (2,4,6-trimethylbenzoyl-diphenylphosphine oxide, Trademark Lucirin® TPO from BASF) and Irgacure 1076® (Ciba Geigy) are commercially available photoinitiators.

Figure 1:
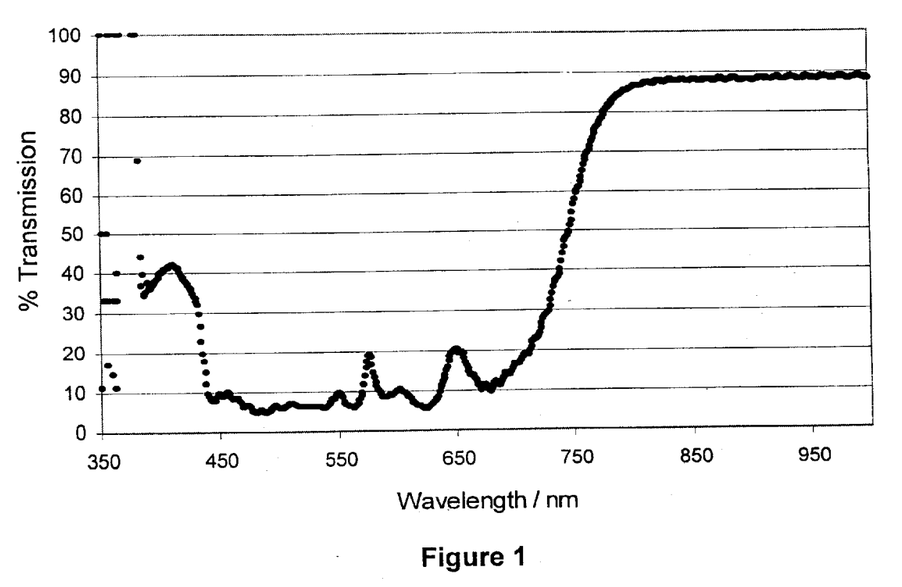
FIGS. 1 and 2 represent embodiments of the present invention.

The mixture was coated as a film of 20 μm thickness between two PET substrates and polymerized by irradiation with UV light of 0.06 mW/cm² to give a polymer film having silver appearance and reflecting circular polarized light of a waveband from 450–740 nm. The reflection spectrum of the film is shown in FIG. 1.

Example 2
Preparation of a Broadband Cholesteric Film
The following polymerizable mixture was prepared

| | |
|---|---|
| Compound (1) | 65.0% |
| Compound (2) | 19.04% |
| Compound (3) | 15.0% |
| Compound (4) | 0.5% |
| TPO | 0.4% |
| Irgacure 1076 | 0.06% |

Figure 2:
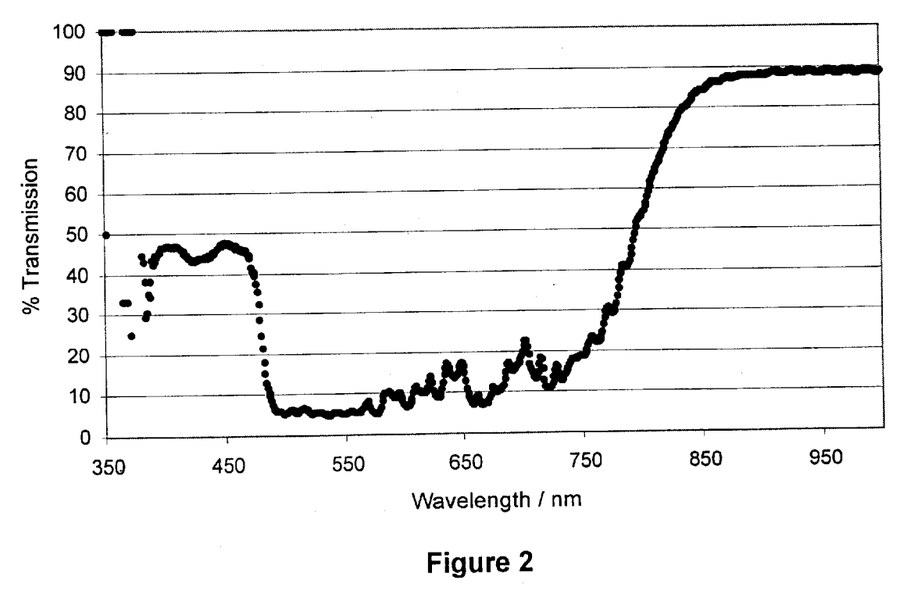

The mixture was coated and polymerized as described in example 1 to give a polymer film having gold appearance and reflecting circular polarized light of a waveband from 500–800 nm. The reflection spectrum of the film is shown in FIG. 2.

Example 3
Preparation of Broadband Pigment Flakes
The film of example 1 was mixed with dry ice powder and ground in a mortar mill to give flakes with a diameter from 5 to 60 µm. 1.8 g of the flakes were dispersed in 55.3 g NC lacquer and coated onto black and white cards. When observed under unpolarized light, the coating appears as a coating of normal silver pigments. When observed under two different handednesses of circularly polarized light, the coating appears bright under one handedness and dark under the other handedness.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal pigment comprising: at least one layer of anisotropic polymer material with a helically twisted molecular structure wherein the helical axis is oriented substantially perpendicular to the plane of the layer and showing reflection of circularly polarized light, wherein the bandwidth of the reflected wavelength band is at least 100 nm, and wherein said liquid crystal pigment is in the form of a particle.

2. A liquid crystal pigment according to claim 1, wherein the bandwidth of the reflected waveband is at least 210 nm.

3. A liquid crystal pigment according to claim 1, wherein the reflected waveband encompasses at least a portion of the visible spectrum of light.

4. A liquid crystal pigment according to claim 1, wherein the reflected waveband encompasses the visible spectrum of light.

5. A liquid crystal pigment according to claim 1, wherein the helical pitch within the layer of liquid crystalline polymer material varies asymmetrically in the direction normal to the layer.

6. A liquid crystal pigment according to claim 1, wherein the liquid crystalline polymer material forms a three-dimensional network.

7. A reflective film, a coating, a cosmetic composition, a pharmaceutical compositions, an optical element or a security marking or device comprising a liquid-crystal pigment according to claim 1.

8. A reflective film or coating comprising at least one liquid crystal pigment according to claim 1 in a transmissive binder.

9. A reflective film or coating comprising at least two different pigments according to claim 1 in a transmissive binder.

10. A reflective film or coating according to claim 9, wherein said at least two different pigments reflect circularly polarized light of different handedness.

11. A security marking or device comprising at least one pigment according to claim 1.

12. A security marking or device comprising at least one reflective film or coating according to claim 8.

13. A pigment according to claim 1, wherein the anisotropic polymer material is obtained by polymerizing at least one reactive mesogen of formula I $$P—(Sp—X)_n—MG—R$$

wherein
P is $CH_2$=CW—COO—, WCH=CH—O—, or $CH_2$=CH—Phenyl—(O)$_k$—,
W is H, $CH_3$ or Cl,
k is 0 or 1,
Sp is a spacer group having 1 to 25 C atoms,
X is —O—, —S—, —CO—, —COO—, —OCO—, —CO—NH—, —NH—CO—, —$CH_2CH_2$—, —$OCH_2$—, —$CH_2O$—, —$SCH_2$—, —$CH_2S$—, —CH=CH—, —CH=CH—COO—, —OCO—CH=CH—, —C≡C—, or a single bond,
n is 0 or 1,
MG is a mesogenic group, and
R is P—(Sp—X)$_n$-, H, CN, halogen or a straight-chain or branched alkyl radical with up to 25 C atoms that is unsubstituted, mono- or polysubstituted by halogen or CN, wherein optionally one or more non-adjacent $CH_2$ groups are replaced, in each case independently from one another, by —O—, —S—, —NH—, —N($CH_3$)—, —CO—, —COO—, —OCO—, —OCO—O', —S—CO—, —CO—S— or —C≡C— in such a manner that oxygen atoms are not linked directly to one another.

14. A pigment according to claim 1, wherein the pigment reflects circularly polarized light of a single handedness.

15. A liquid crystal pigment according to claim 1, wherein the reflected waveband covers the spectrum of wavelenghts from 450 to 750 nm.

16. A liquid crystal pigment in the form of a particle comprising
at least one layer of anisotropic polymer material with a helically twisted molecular structure wherein the helical axis is oriented substantially perpendicular to the plane of the layer and showing reflection of circularly polarized light,
wherein the bandwidth of the reflected wavelength band is at least 100 nm, and wherein said liquid crystal pigment is in the form of a particle, wherein the pigment particles have a thickness of 0.1–100 microns and a lateral dimension of 1–1,000 microns.

17. A liquid crystal pigment according to claim 1, wherein the at least one layer of anisotropic polymer material is obtained by polymerizing a cholesteric liquid crystal polymerizable mixture containing 5–100% of one or more multireactive mesogenic compounds.

18. A liquid crystal pigment according to claim 1, when the at least one layer of anisotropic polymer material is obtained by polymerizing a cholesteric liquid crystal polymerizable mixture comprising:
A) 5 to 80% by weight of up to five, monoreactive mesogenic compounds having a polar terminal group,
B) 10 to 90% by weight of up to four, direactive polymerizable mesogenic compounds,
C) 0.1 to 15% by weight of up to three, non-polymerizable chiral dopants,
D) 0.5 to 10% by weight of a polymerization initiator, and
E) 0 to 5% by weight of one or more surfactants.

19. A liquid crystal pigment according to claim 1, wherein the particles have an average dimensions of 1 to 100 microns.

20. A liquid crystal pigment according to claim 1, wherein the particles have an average dimension of 0.5 to 1.5 mm.

21. A liquid crystal pigment according to claim 1, wherein the particles are platelet shaped flakes having an aspect ratio of 3:1 to 20:1.

22. A liquid crystal pigment according to claim 21, wherein the particles have a thickness of 1 to 50 microns and a diameter of 1 to 50 microns.

23. A liquid crystal pigment according to claim 1; wherein the particles have a granular shape with an aspect ratio of less than 10:1 and a diameter of 1 to 50 microns.

24. A pigment according to claim 1, wherein said pigment is gold or silver in appearance.

25. A liquid crystal pigment in the form of a particle comprising one or two substrates that are in the form of particles and thereon or between the two substrates at least one layer of anisotropic polymer material with a helically twisted molecular structure wherein the helical axis is oriented substantially perpendicular to the plane of the layer and showing reflection of circularly polarized light, wherein the bandwidth of the reflected wavelength band is at least 100 nm.

26. A pigment according to claim 25, wherein the pigment particles have a thickness of 0.1 to 100 microns and a lateral dimension of 1 to 1000 microns.

27. A method of preparing a pigment according to claim 1, comprising coating a layer of a polymerizable cholesteric liquid crystal material onto a substrate or between two substrates, aligning the polymerizable cholesteric liquid crystal material in the coated layer into a uniform orientation, polymerizing the polymerizable cholesteric liquid crystal material by exposure to heat or actinic radiation whereby the polymerizable material forms a polymer film, optionally removing the one or two substrates from the polymer film, and grinding the polymer film into particles to form the pigment.

28. A pigment according to claim 13, wherein
MG is of formula II wherein $Z^1$ and $Z^2$ are, each independently, —COO—, —OCO—, —CH$_2$CH$_2$—, OCH$_2$—, —CH$_2$O—, —CH=CH—, —CH=CH—COO—, —OCO—CH=CH—, C≡C—, or a single bond, $A^1$, $A^2$ and $A^3$ are, each independently, 1,4-phenylene in which optionally one or more CH groups are replaced by N, 1,4-cyclohexylene in which optionally one or two non-adjacent CH$_2$ groups are replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydro-naphthalene-2,6-diyl, each optionally unsubstituted, mono- or polysubstituted with F, Cl, OH, CN or NO$_2$ or with an alkyl, alkoxy or alkanoyl group each having 1 to 7 C atoms, in which one or more H atoms are optionally substituted with F or Cl, and m is 0, 1 or 2.

* * * * *